(12) United States Patent
Choi

(10) Patent No.: US 12,393,370 B2
(45) Date of Patent: Aug. 19, 2025

(54) STORAGE DEVICE SETTING ZONE WHERE COLD DATA IS TO BE STORED AND METHOD OF OPERATING THE STORAGE DEVICE

(71) Applicant: SK hynix Inc., Icheon-si (KR)

(72) Inventor: Kyu Ho Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/545,131

(22) Filed: Dec. 19, 2023

(65) Prior Publication Data
US 2025/0053337 A1  Feb. 13, 2025

(30) Foreign Application Priority Data
Aug. 10, 2023 (KR) .......... 10-2023-0104647

(51) Int. Cl.
*G06F 3/06* (2006.01)

(52) U.S. Cl.
CPC .......... *G06F 3/0659* (2013.01); *G06F 3/0604* (2013.01); *G06F 3/0656* (2013.01); *G06F 3/0673* (2013.01)

(58) Field of Classification Search
CPC .... G06F 3/0659; G06F 3/0604; G06F 3/0656; G06F 3/0673
See application file for complete search history.

(56) References Cited

U.S. PATENT DOCUMENTS

| 10,854,290 B1 | 12/2020 | Wu et al. | |
| 2011/0138148 A1* | 6/2011 | Friedman | G06F 3/0644 |
| | | | 711/E12.001 |
| 2021/0048952 A1* | 2/2021 | Cariello | G06F 3/0679 |

FOREIGN PATENT DOCUMENTS

KR  10-2023-0050695 A  4/2023

\* cited by examiner

*Primary Examiner* — Jae U Yu

(57) ABSTRACT

A storage device may receive provisioning information, which is setting information for a provisioning operation that sets a plurality of zones on a memory, from a host, and set a first zone in which cold data requested to be written by the host is stored, among the plurality of zones based on write booster type included in the provisioning information. The storage device may set the first zone in a first memory area if the write booster type is a first type, and set the first zone in a second memory area if the write booster type is a second type.

12 Claims, 9 Drawing Sheets

STORAGE DEVICE SETTING ZONE WHERE COLD DATA IS TO BE STORED AND METHOD OF OPERATING THE STORAGE DEVICE

CROSS-REFERENCES TO RELATED APPLICATION

The present application claims the benefit of priority under 35 U.S.C. § 119 (a) to Korean Patent Application Number 10-2023-0104647 filed in the Korean Intellectual Property Office on Aug. 10, 2023, which is incorporated herein by reference in its entirety.

BACKGROUND

1. Technical Field

Various embodiments of the present disclosure generally relate to a storage device setting a zone where cold data is to be stored, and a method of operating the storage device.

2. Related Art

A storage device is a device for storing data according to a request from an external device such as a computer, a mobile terminal such as a smart phone or tablet, or the like.

A storage device may include a memory (e.g., a volatile memory or a non-volatile memory) and a controller for controlling the memory. The controller may receive a command from an external device (i.e., a host), and execute or control operations to read, write, or erase data in the memory included in the storage device according to the received command.

The type of data stored in such storage devices may be hot, warm, or cold. When receiving a write command requesting to write data, the storage device may determine the type of the data through hint information included in the write command.

SUMMARY

Embodiments of the present disclosure may provide a storage device capable of providing fast read speed and fast write speed for cold data, and a method of operating the storage device.

In one aspect, embodiments of the present disclosure may provide a storage device comprising i) a memory including a plurality of memory blocks having a first memory area including memory blocks with a first write speed and a first read speed and a second memory area including memory blocks with a second write speed slower than the first write speed and a second read speed slower than the first read speed, and ii) a controller configured to receive, from a host, provisioning information used to set a plurality of zones in the memory, and set a first zone from among the plurality of zones to store cold data based on a write booster type included in the provisioning information. In this case, the controller may be configured to set the first zone in the first memory area when the write booster type is a first type, and set the first zone in the second memory area when the write booster type is a second type.

In another aspect, embodiments of the present disclosure may provide a method of operating a storage device comprising the operations of i) receiving provisioning information including a write booster type from a host, ii) setting a plurality of zones in a memory including a plurality of memory blocks based on the provisioning information, iii) setting a first zone from among the plurality of zones based on the write booster type, iv) receiving cold data from the host, and v) writing the cold data to the first zone. In the operation of setting the first zone, the first zone is set in a first memory area including memory blocks with a first write speed and a first read speed if the write booster type is a first type, and the first zone is set in a second memory area including memory blocks with a second write speed slower than the first write speed and with a second read speed slower than the first read speed if the write booster type is a second type.

According to embodiments of the present disclosure, it is possible to provide a storage device operated at a faster read speed and a faster write speed for cold data and an operation method thereof.

DETAIL DESCRIPTION

Figure 1:
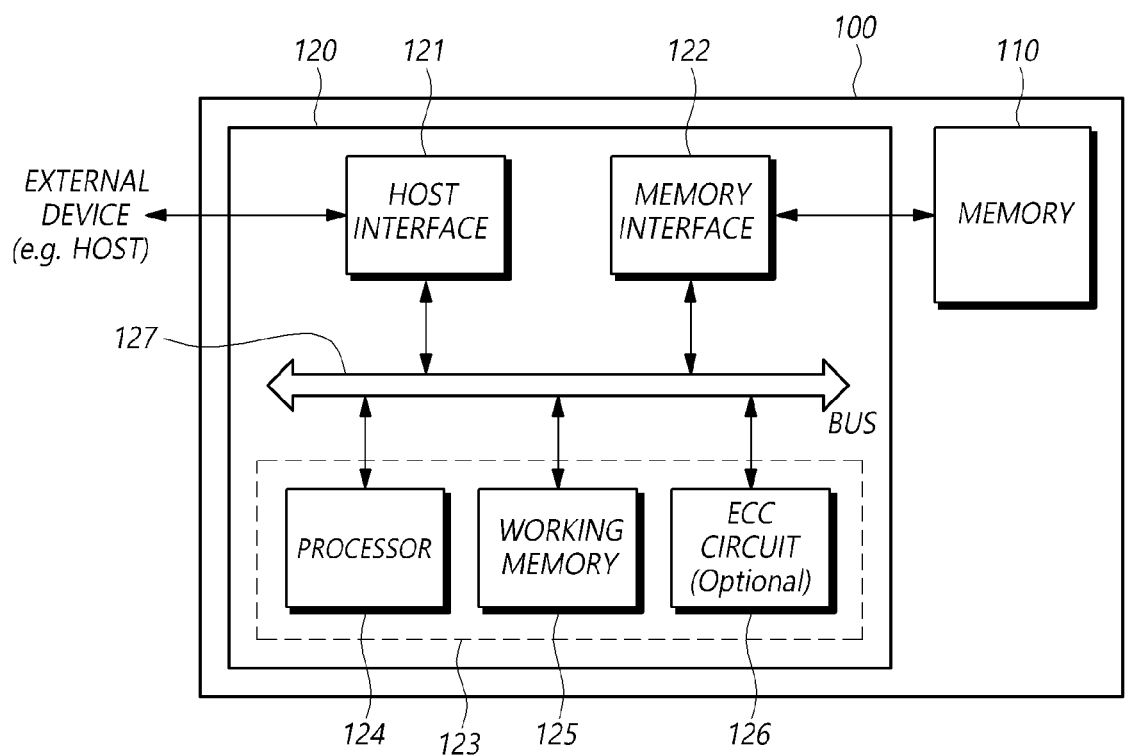
FIG. 1 is a schematic configuration diagram of a storage device according to embodiments of the present disclosure.

Hereinafter, embodiments of the present disclosure are described in detail with reference to the accompanying drawings. Throughout the specification, reference to "an embodiment," "another embodiment," or the like is not necessarily to only one embodiment, and different references to any such phrase are not necessarily limited to the same embodiment(s). The term "embodiments" used herein does not necessarily refer to all embodiments.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the present invention to those skilled in the art to which this present disclosure pertains. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to embodiments of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. The memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), and a spin transfer torque random access memory (STT-RAM).

The memory 110 may be implemented as a three-dimensional array structure. For example, embodiments of the disclosure may be applied not only to a charge trap flash (CTF) in which a charge storage layer is configured by a dielectric layer, but also to a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation, or an erase operation. For example, when performing the program operation, the memory 110 may program, or write, data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a movable device operated under human control or in autonomous driving (e.g., a vehicle, a robot or a drone), and others. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified as a general operating system or a mobile operating system depending on the mobility of the host.

The controller 120 and the host may be devices that are separated from each other, or the controller 120 and the host may be integrated into one device. Hereunder, for convenience in explanation, the controller 120 and the host will be described as separate devices.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol, and a private protocol.

When receiving a command from the host, the control circuit 123 may receive the command through the host interface 121, and may perform an operation of processing the received command.

The memory interface 122 may be connected to the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL) and may translate a logical block address (LBA), provided by the host, into a physical block address (PBA) through the flash translation layer (FTL). The flash translation layer (FTL) may receive the logical block address (LBA) from the host and translate the logical block address (LBA) into the physical block address (PBA), by using a mapping table.

There are various address mapping methods of the flash translation layer, depending on a mapping unit. Representative address mapping methods include a page mapping method, a block mapping method, and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implemented by the processor 124, which executes firmware defining the corresponding operation.

The firmware, as a program to be executed in the storage device 100 to drive the storage device 100, may include various functional layers. For example, the firmware may include binary data that define codes for executing the functional layers, respectively.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 from the host and transfer the command to the flash translation layer (FTL); and a flash interface layer (FIL) that transfers a command, instructed from the flash translation layer (FTL), to the memory 110.

The firmware may be loaded in the working memory 125 from, for example, the memory 110 or from a separate nonvolatile memory (e.g., a ROM or a NOR Flash) located outside the memory 110. The processor 124 may first load all or a part of the firmware into the working memory 125 when executing a booting operation after power-on.

The processor 124 may perform a logic calculation that is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. If a part of firmware that defines a logic calculation to be performed is stored in the memory 110 but not loaded in the working memory 125, then the processor 124 may generate an event (e.g., an interrupt) for loading the corresponding part of the firmware into the working memory 125 from the memory 110.

The processor 124 may load metadata necessary for driving the firmware from the memory 110. The metadata, which is data for managing the memory 110, may include, for example, management information on user data stored in the memory 110.

The firmware may be updated while the storage device 100 is manufactured or while the storage device 100 is operating. The controller 120 may download new firmware from an external device located outside of the storage device 100 and update the existing firmware with new firmware.

To drive the controller 120, the working memory 125 may store necessary firmware, program codes, commands and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders such as a decoder that performs unsystematic code decoding or a decoder that performs systematic code decoding.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may correspond to one another using an address.

The error detection and correction circuit 126 may calculate a bit error rate (BER), and may determine whether an error is correctable or not, by sector units. For example, if a bit error rate (BER) is higher than a reference value, the error detection and correction circuit 126 may determine that a corresponding sector is uncorrectable or a fail. On the other hand, if a bit error rate (BER) is lower than the reference value, the error detection and correction circuit 126 may determine that a corresponding sector is correctable or a pass.

The error detection and correction circuit 126 may perform an error detection and correction operation sequentially for all read data. If a sector included in read data is correctable, then the error detection and correction circuit 126 may omit an error detection and correction operation for a corresponding sector for next read data. When the error detection and correction operation for all read data is finished in this way, the error detection and correction circuit 126 may detect a sector that is uncorrectable in read data last. There may be one or more sectors that are determined to be uncorrectable. The error detection and correction circuit 126 may transfer information (e.g., address information) regarding the sectors that are determined to be uncorrectable to the processor 124.

A bus 127 may be configured to provide a channel among the components 121, 122, 124, 125 and 126 of the controller 120. The bus 127 may include, for example, a control bus for transferring various control signals, commands, and the like, and a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
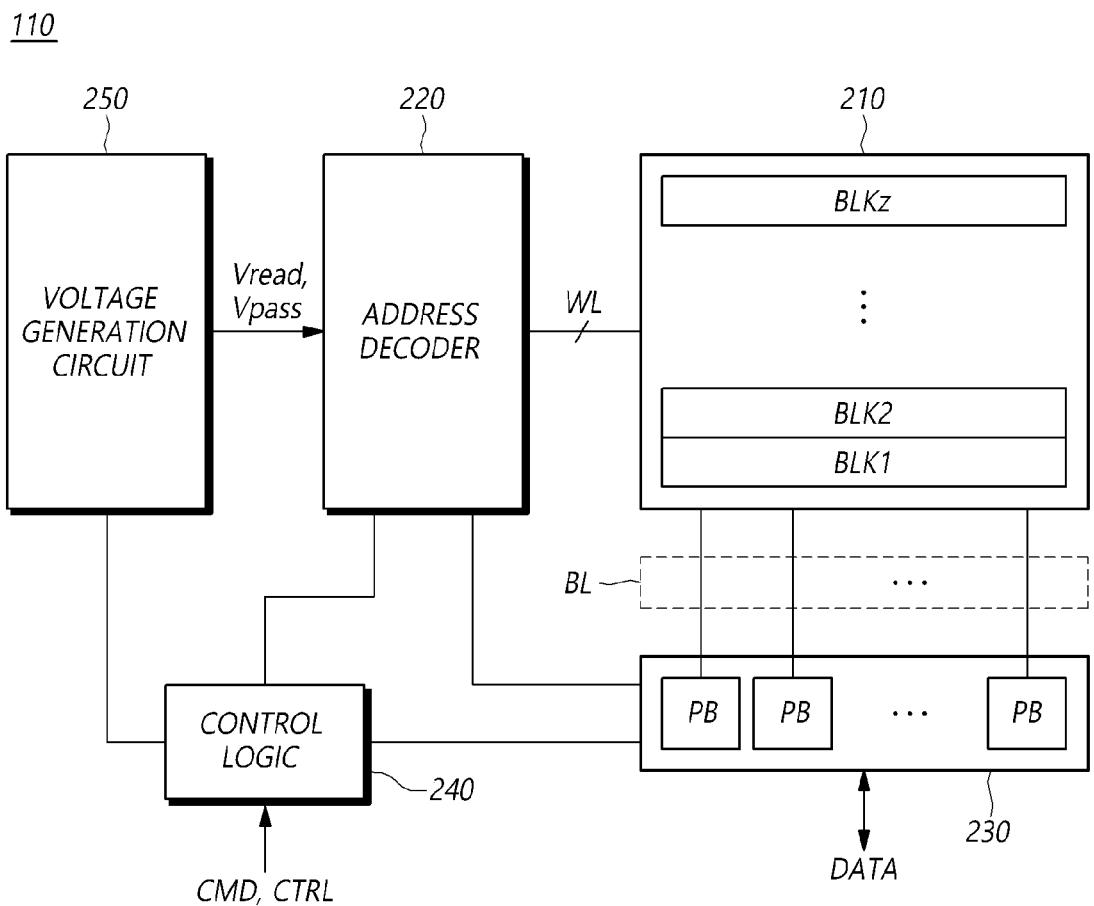
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that are arranged in vertical channel structures.

The memory cell array 210 may be configured in a two-dimensional structure or in a three-dimensional structure.

Each of the plurality of memory cells included in the memory cell array 210 may store at least 1-bit data. For example, each of the plurality of memory cells included in the memory cell array 210 may be a signal level cell (SLC) that stores 1-bit data. In another example, each of the plurality of memory cells included in the memory cell array 210 may be a multi-level cell (MLC) that stores 2-bit data. In yet another example, each of the plurality of memory cells included in the memory cell array 210 may be a triple level cell (TLC) that stores 3-bit data. In a further example, each of the plurality of memory cells included in the memory cell array 210 may be a quad level cell (QLC) that stores 4-bit data. In still another example, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240, and the voltage generation circuit 250 may operate as a peripheral circuit that drives the memory cell array 210.

The address decoder 220 may be connected to the memory cell array 210 through the plurality of word lines WL.

The address decoder 220 may be configured to operate in response to the control signal of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block and apply the pass voltage Vpass to the remaining unselected word lines WL.

During a program verify operation, the address decoder 220 may apply a verify voltage generated in the voltage generation circuit 250 to a selected word line WL in a selected memory block and apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. When a read operation or a program operation is requested, the received address may include at least one from among a block address, a row address, and a column address.

The address decoder 220 may select one memory block from among the memory blocks BLK1 to BLKz based on a block address and one word line from among the word lines WL based on a row address. A column address may be decoded by the address decoder 220 and be provided to the read and write circuit 230.

The address decoder 220 may include at least one from among a block decoder, a row decoder, a column decoder, and an address buffer.

The read and write circuit 230 may include a plurality of page buffers PB. The read and write circuit 230 may operate as a read circuit when the memory cell array 210 performs a read operation, and may operate as a write circuit when the memory cell array 210 performs a write operation.

The read and write circuit 230 described above may also be referred to as a page buffer circuit or a data register circuit that includes a plurality of page buffers PB. The read and write circuit 230 may include data buffers that perform a data processing function, and may further include cache buffers that perform a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may sense, at sensing nodes, changes in the amounts of current flowing that vary depending on the program states of the corresponding memory cells to latch voltages corresponding to the detected change as sensing data.

The read and write circuit 230 may operate in response to page buffer control signals outputted from the control logic 240.

During a read operation, the read and write circuit 230 may sense a voltage value of a memory cell, and the voltage value may be retrieved as read data of memory cell. The read and write circuit 230 may temporarily store the retrieved read data and then output it as data DATA to the input/output buffer of the memory 110. In an exemplary embodiment, the read and write circuit 230 may include a column select circuit in addition to the page buffers PB or the page registers.

The control logic 240 may be connected to the address decoder 220, the read and write circuit 230, and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line, which may be the ground, directly or via another transistor. The gate of the transistor may include a floating gate, which is surrounded by a dielectric, and a control gate to which a gate voltage is applied from a word line WL.

In each of the memory blocks BLK1 to BLKz, a first select line (also referred to as a source select line or a drain select line) may be additionally disposed outside a first outermost word line of two outermost word lines, which is more adjacent to the read and write circuit 230, and a second select line (also referred to as a drain select line or a source select line) may be additionally disposed outside a second outermost word line of the two outermost word lines.

At least one dummy word line may be additionally disposed between the first outermost word line and the first select line. In addition, at least one dummy word line may be disposed between the second outermost word line and the second select line.

A read operation and a program operation (write operation) of the memory block described above may be performed by the unit of a page, and an erase operation may be performed by the unit of a memory block.

Figure 3:
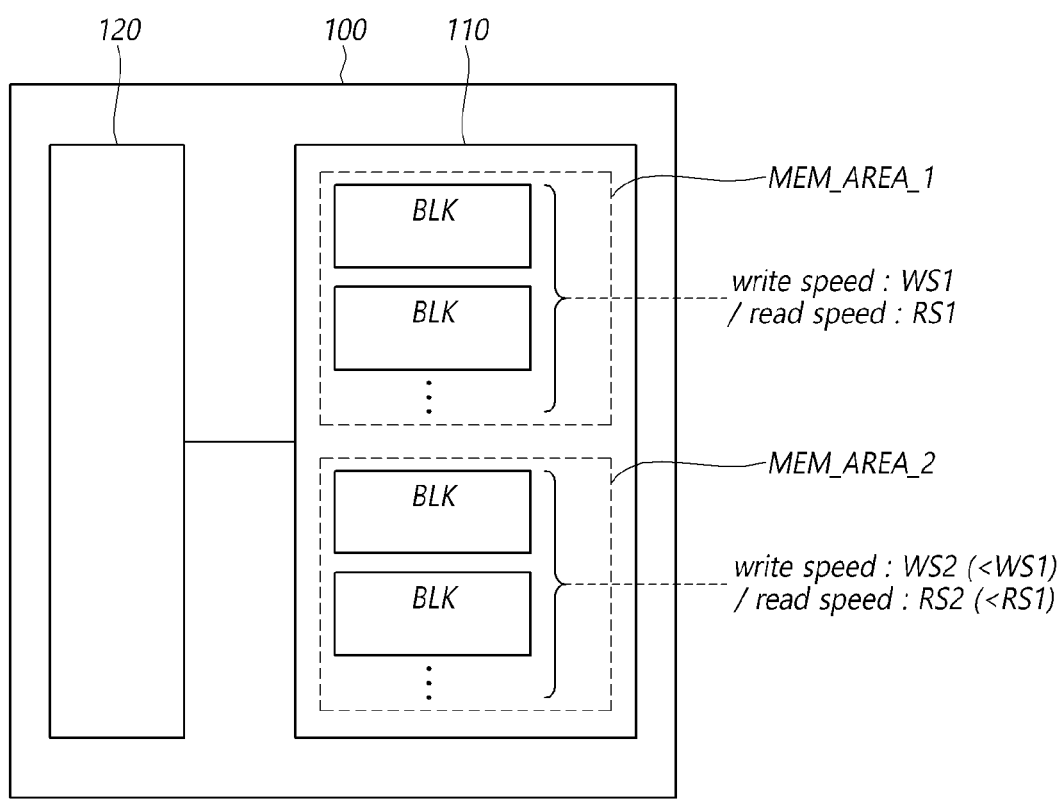
FIG. 3 illustrates a schematic structure of a storage device according to embodiments of the present disclosure.

FIG. 3 illustrates a schematic structure of a storage device according to embodiments of the present disclosure.

Referring to FIG. 3, a storage device 100 may include a memory 110 and a controller 120.

The memory 110 may include a plurality of memory blocks BLK for storing data.

In addition, the memory 110 may include a first memory area MEM_AREA_1 that includes memory blocks BLK having a first write speed WS1 and a first read speed RS1.

The memory 110 may also include a second memory area MEM_AREA_2 that includes memory blocks BLK having a second write speed WS2 and a second read speed RS2. The second write speed WS2 may be slower than the first write speed WS1, and the second read speed RS2 may be slower than the first read speed RS1. The number of storable bits per memory cell of memory blocks BLK included in the second memory area MEM_AREA_2, however, may be greater than the number of storable bits per memory cell of memory blocks BLK included in the first memory area MEM_AREA_1. The controller 120 may dynamically determine read speed, write speed, and number of storable bits per memory cell of memory block BLK. For example, the controller 120 may convert a memory block BLK in which the number of storable bits per memory cell is 1 into a memory block BLK in which the number of storable bits per memory cell is 2.

The memory blocks BLK included in the first memory area MEM_AREA_1 and the memory blocks BLK included in the second memory area MEM_AREA_2 may be determined as follows.

The memory blocks BLK included in the first memory area MEM_AREA_1 may be single level cells (SLC) memory blocks, and the memory blocks BLK included in the second memory area MEM_AREA_2 may be triple level cells (TLC) memory blocks.

In another example, the memory blocks BLK included in the first memory area MEM_AREA_1 may be SLC memory blocks that include single level cells (SLC), and the memory blocks BLK included in the second memory area MEM_AREA_2 may be MLC memory blocks that include multi-level cells (MLC) or quad level cells (QLC).

The controller 120 may control operations of the storage device 100. The controller 120 may perform operations of writing data to the memory 110 and reading data from the memory 110. The controller 120 may control the memory 110 to perform a read operation or write operation according to a request from an external device (e.g., host). Additionally, the controller 120 may control the memory 110 to perform background operations (e.g., garbage collection, wear leveling, and/or read reclaim) that operate independently from the external device.

The controller 120 may dynamically set a start address and a size of the first memory area MEM_AREA_1 and the second memory area MEM_AREA_2.

In addition, the controller 120 may set a plurality of zones in the memory 110. When the zones are set, data may be written sequentially in each of the plurality of zones.

Hereinafter, a provisioning operation for setting the plurality of zones will be described in detail in FIG. 4.

Figure 4:
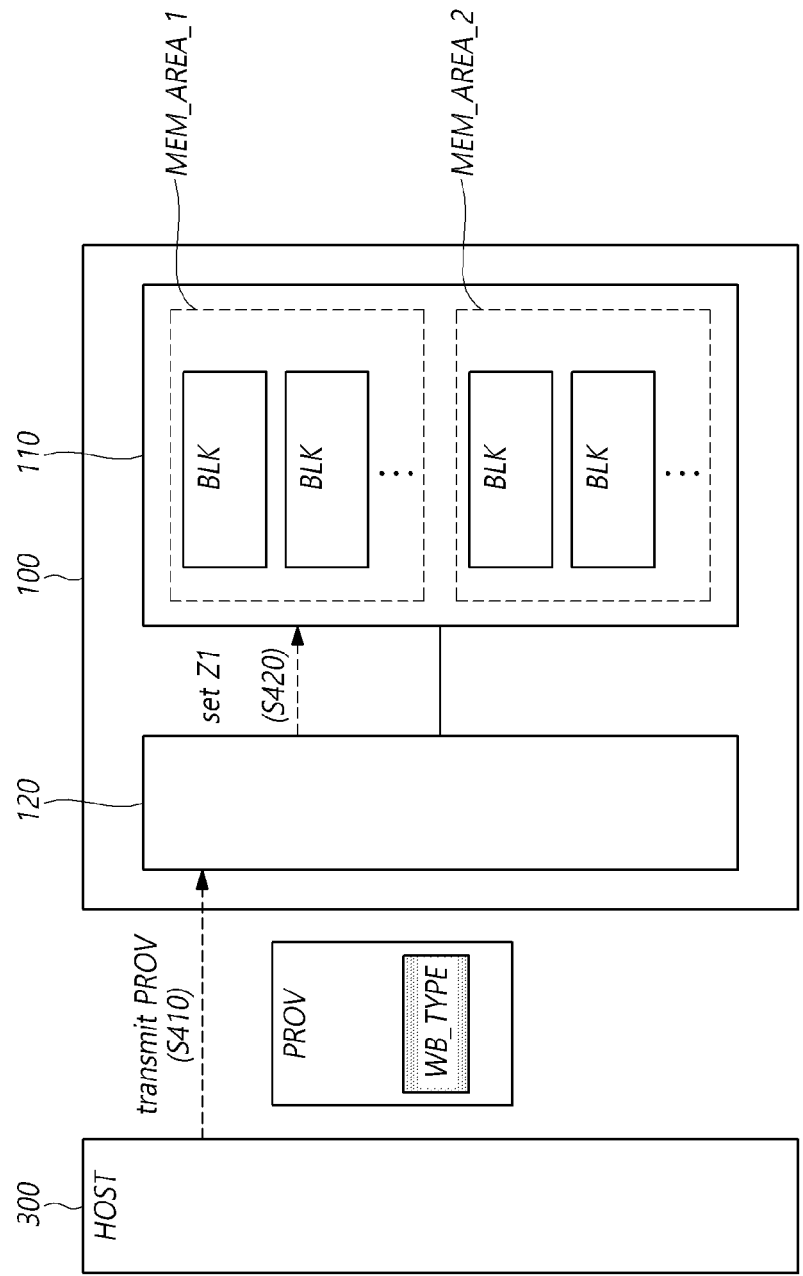
FIG. 4 illustrates an operation in which a storage device receives provisioning information according to embodiments of the present disclosure.

FIG. 4 illustrates an operation in which a storage device receives provisioning information according to embodiments of the present disclosure.

Referring to FIG. 4, a host 300 may transmit provisioning information PROV to a controller 120 of a storage device 100 (S410). For example, the host 300 may transmit the provisioning information PROV to the controller 120 when performing a booting operation.

The provisioning information PROV is setting information for a provisioning operation that is used to set a plurality of zones in the memory 110. The controller 120 may perform the provisioning operation based on the provisioning information PROV. The controller 120 may partition a storage space of the memory 110 into a plurality of zones through the provisioning operation and set characteristics and purposes for each of the plurality of zones, respectively.

The controller 120 may change the size of the first memory area MEM_AREA_1 or the second memory area MEM_AREA_2 based on the provisioning information PROV.

The controller 120 may set a first zone Z1 from among the plurality of zones based on a write booster type WB_TYPE included in the provisioning information PROV (S420). The first zone Z1 may store cold data when requested to be written by the host 300.

The write booster type WB_TYPE is a value that indicates an attribute of a write booster buffer. The write booster buffer may be used to temporarily store data requested to be written by the host 300. That is, data requested to be written by the host 300 may be stored in the write booster buffer and then migrated to another memory area outside the write booster buffer.

In the embodiments of the present disclosure, the controller 120 may use the first memory area MEM_AREA_1 as the write booster buffer. If the memory blocks BLK of the first memory area MEM_AREA_1 include SLC memory blocks, then data requested to be written by the host 300 may be quickly stored in the first memory area MEM_AREA_1.

The write booster buffer may temporarily store data requested to be written to the second memory area MEM_AREA_2. The data requested to be written by the host 300 may be temporarily stored in the write booster buffer, and may later be migrated to the second memory area MEM_AREA_2.

Meanwhile, based on the provisioning information PROV, the controller 120 may set the size of the first memory area MEM_AREA_1 to be used as the write booster buffer. For example, the controller 120 may set the size of the first memory area MEM_AREA_1 based on the size of the write booster buffer set in the provisioning information PROV.

In the embodiments of the present disclosure, the controller 120 may determine the location of the first zone Z1 as the first memory area MEM_AREA_1 or the second memory area MEM_AREA_2 according to the write booster type WB_TYPE, and may write cold data to the first zone Z1. Hereinafter, the operation of writing cold data will be described in detail in FIGS. 5 to 6.

Figure 5:
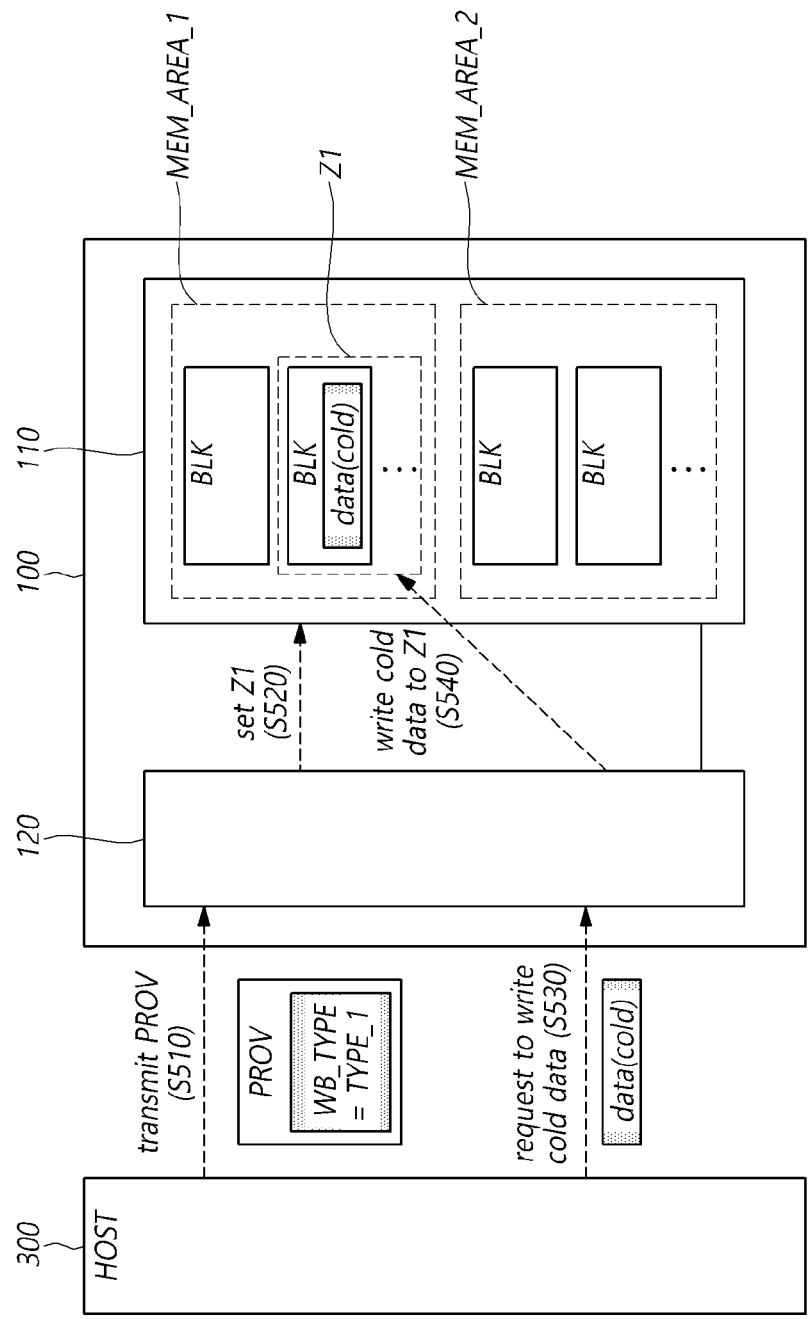
FIG. 5 illustrates an example of an operation in which a storage device writes cold data to a first zone according to embodiments of the present disclosure.

FIG. 5 illustrates an example of an operation in which a storage device writes cold data to a first zone according to embodiments of the present disclosure.

Referring to FIG. 5, a host 300 may transmit provisioning information PROV to a controller 120 of a storage device 100 (S510). At this time, a write booster type WB_TYPE included in the provisioning information PROV may be a first type TYPE_1.

The controller 120 may set a first zone Z1 based on the provisioning information PROV received from the host 300 (S520). The controller 120 may set the first zone Z1 within the first memory area MEM_AREA_1 if the write booster type WB_TYPE is the first type TYPE_1. In FIG. 5, the first zone Z1 includes one or more memory blocks BLK within the first memory area MEM_AREA_1, as an example. However, the size of the first zone Z1 may be smaller than the size of a memory block BLK (not illustrated), or the first zone Z1 may be distributed across a plurality of memory blocks BLK included in the first memory area MEM_AREA_1.

When the controller 120 sets the first zone Z1, the controller 120 may set a start address and a size of the first zone Z1 to an unchangeable state.

Consequently, the controller 120 cannot change the start address and size of the first zone Z1 until it receives a subsequent provisioning operation request from the host 300 during a subsequent booting operation.

Afterwards, the host 300 may request the controller 120 to write cold data (S530). The controller 120 may recognize, through hint information included in a write request provided from the host 300, that the data to be written is cold data. The hint information indicates an attribute (e.g., hot/warm/cold) of the data requested to be written.

The controller 120 may write cold data to the first zone Z1 after receiving a write request for the cold data from the host 300 (S540). Accordingly, the cold data may be stored in the first memory area MEM_AREA_1 in which the first zone Z1 is set. The controller 120 may determine that the data requested to be written is cold data through the hint information provided by the host 300, and may set the location where the cold data is to be stored as the first zone Z1.

As described above with reference to FIG. 3, memory blocks BLK included in the first memory area MEM_AREA_1 may have a first write speed WS1 and a first read speed RS1. Accordingly, the controller 120 may read and write cold data at a high speed.

Figure 6:
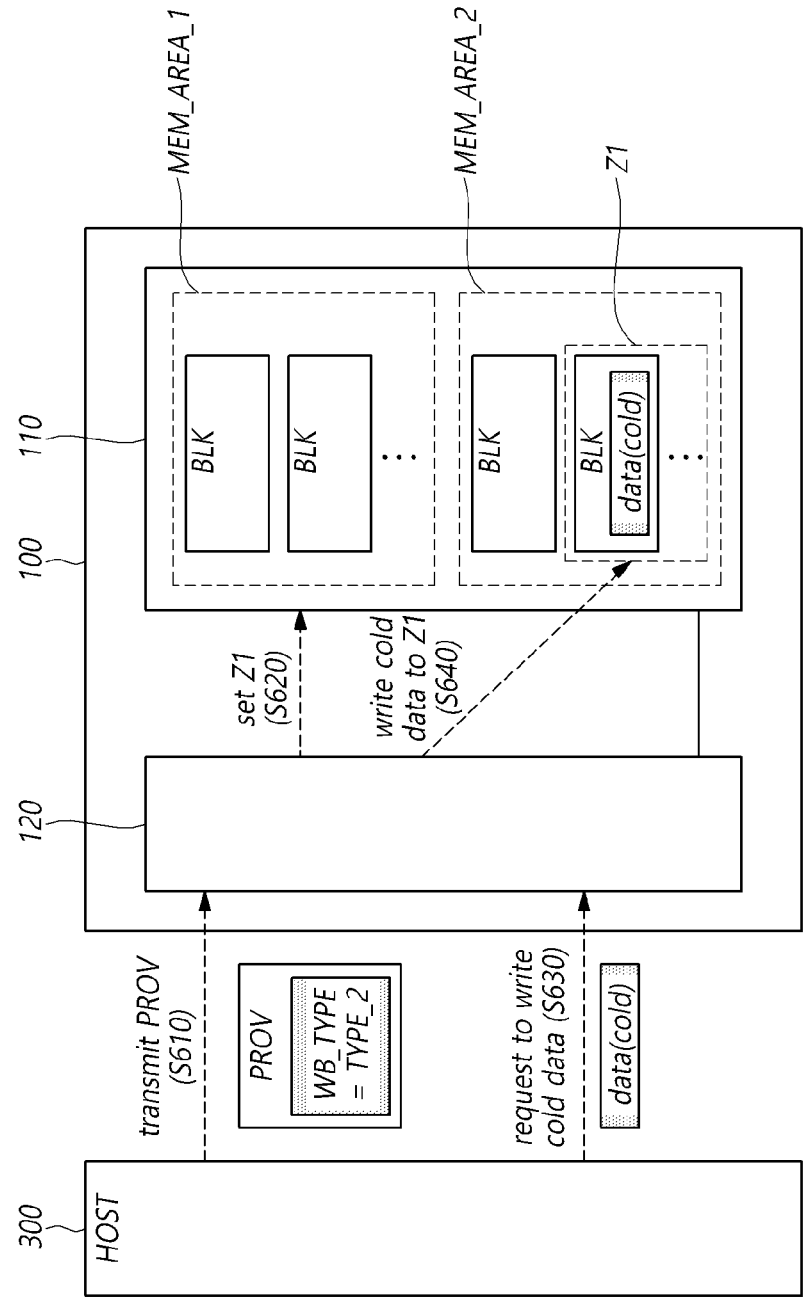
FIG. 6 illustrates another example of an operation in which a storage device writes cold data to a first zone according to embodiments of the present disclosure.

FIG. 6 illustrates another example of an operation in which a storage device writes cold data to a first zone according to embodiments of the present disclosure.

Referring to FIG. 6, a host 300 may transmit a provisioning information PROV to a controller 120 of a storage device 100 (S610). In FIG. 6, a write booster type WB_TYPE included in the provisioning information PROV is a second type TYPE_2.

For example, the second type TYPE_2 may have a value (e.g., 0x00) indicating that the type of write booster buffer is a dedicated type that is used only for a specific logical unit, or the second type TYPE_2 may have a value (e.g., 0x01) indicating that the type of write booster buffer is a shared type, which can be shared by a plurality of logical units. The value of the first type TYPE_1 (e.g., 0x10) may be different from the value of the second type TYPE_2.

The controller 120 may set a first zone Z1 based on the provisioning information PROV received from the host 300 (S620). If the write booster type WB_TYPE is the second type TYPE_2, then the controller 120 may set the first zone Z1 in the second memory area MEM_AREA_2.

In FIG. 6, the host 300 may send a request to write cold data (S630) to the controller 120.

The controller 120 may write cold data to the first zone Z1 after receiving a write request for the cold data from the host 300 (S640). Accordingly, the cold data may be stored in the second memory area MEM_AREA_2.

As described above with reference to FIG. 3, memory blocks BLK included in the second memory area MEM_AREA_2 may have a second write speed WS2 and a second read speed RS2. In an example, the second write speed WS2 is slower than the first write speed WS1 and the second read speed RS2 is slower than the first read speed RS1. Therefore, the controller 120 of FIG. 6 may read and write the cold data at slower speeds relative to the controller 120 of FIG. 5.

Operations in which a storage device writes cold data to a first zone Z1 have been described above with reference to FIGS. 5 and 6.

Hereinafter, an operation of a storage device 100 to write hot or warm data will be described.

Figure 7:
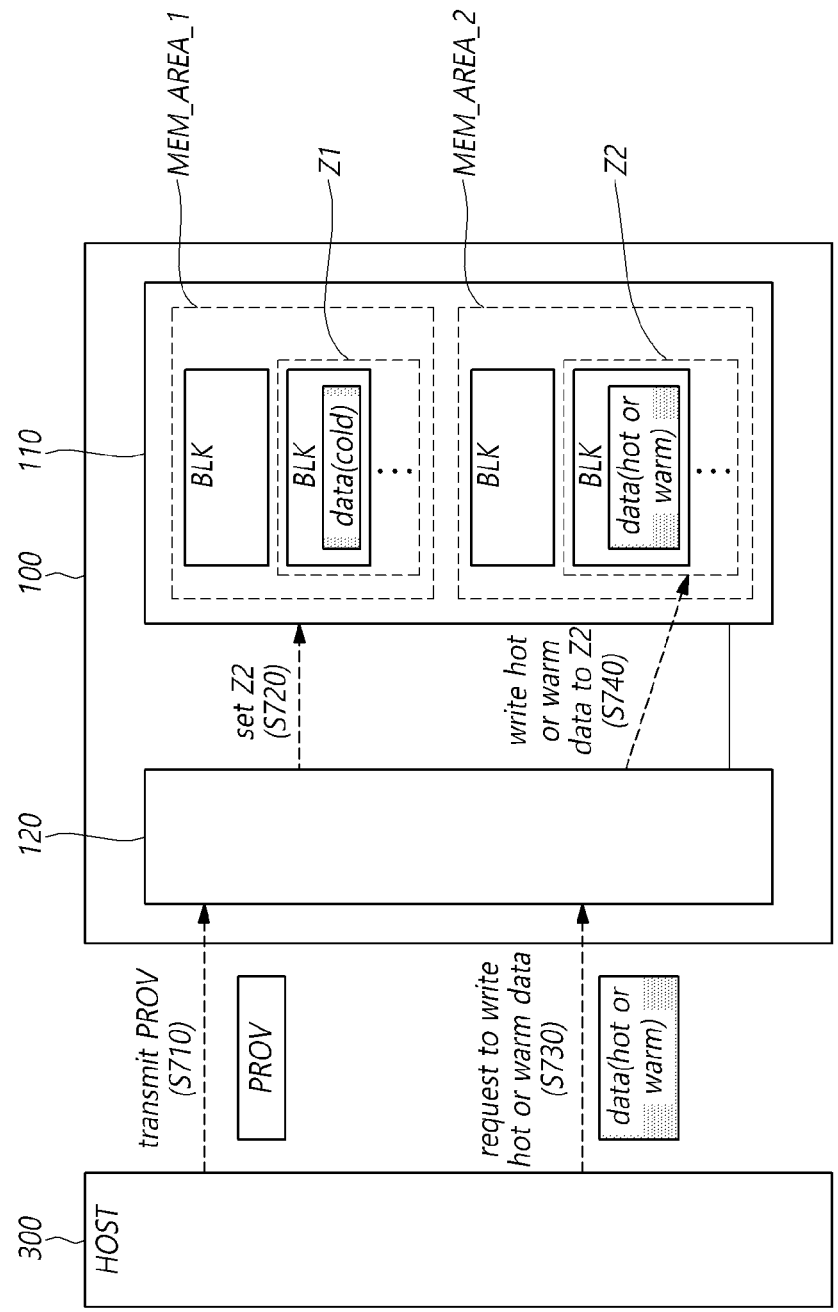
FIG. 7 illustrates an operation in which a storage device writes hot or warm data to a second zone according to embodiments of the present disclosure.

FIG. 7 illustrates an operation in which a storage device 100 writes hot or warm data to a second zone according to embodiments of the present disclosure.

Referring to FIG. 7, a host 300 may transmit a provisioning information PROV to a controller 120 of a storage device 100 (S710).

The controller 120 may set a second zone Z2 based on the provisioning information PROV received from the host 300 (S720), and the controller 120 may set the second zone Z2 in the second memory area MEM_AREA_2. In FIG. 7, the second zone Z2 includes one or more memory blocks BLK included in the second memory area MEM_AREA_2. However, the size of the second zone Z2 may be smaller than the size of a memory block BLK, or the second zone Z2 may be distributed across a plurality of memory blocks BLK included in the second memory area MEM_AREA_2.

In FIG. 7, the first zone Z1 is included in the first memory area MEM_AREA_1, and the second zone Z2 is included in the second memory area MEM_AREA_2. However, in other embodiments, the first zone Z1 may be included in the second memory area MEM_AREA_2 like the second zone Z2.

The host 300 may request the controller 120 to write hot data or warm data (S730). The host 300 may indicate that the data to be written is hot data or warm data through hint information included in a write command.

After receiving a write request for the hot data or warm data from the host 300, the controller 120 may write the hot data or warm data to the second zone Z2 (S740).

Operations of writing data to the first zone Z1 or the second zone Z2 have been described above.

In another operation, the data already written into the first zone Z1 may be migrated to another zone. Hereinafter, operations of migrating cold data will be described with reference to FIG. 8.

Figure 8:
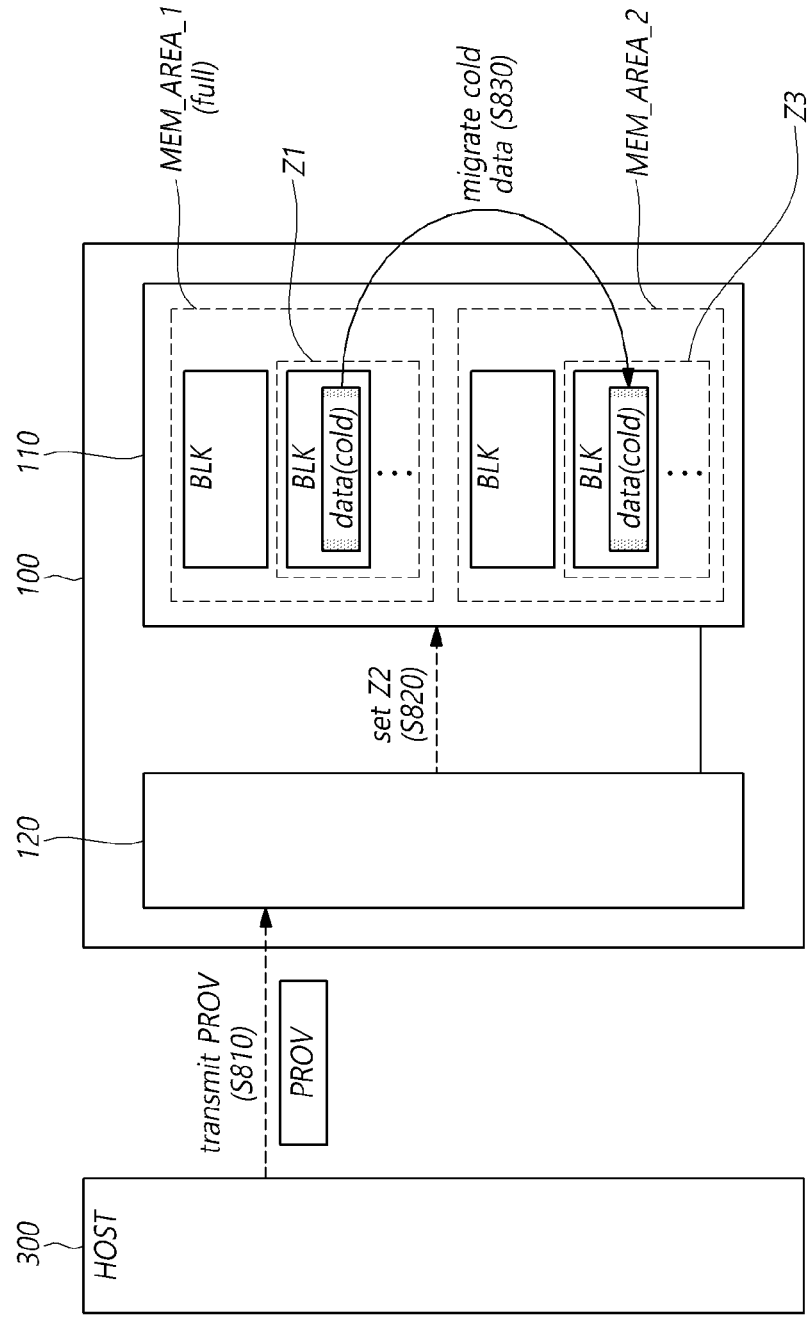
FIG. 8 illustrates an operation in which a storage device migrates cold data written in a first zone to a different zone according to embodiments of the present disclosure.

FIG. 8 illustrates an operation in which a storage device migrates cold data written in a first zone Z1 to a different zone according to embodiments of the present disclosure.

Referring to FIG. 8, a host 300 may transmit a provisioning information PROV to a controller 120 of a storage device 100 (S810).

The controller 120 may set a second zone Z2 based on the provisioning information PROV received from the host 300 (S820), and may set the third zone Z3 in a second memory area MEM_AREA_2. In FIG. 8, the third zone Z3 includes one or more memory blocks BLK included in the second memory area MEM_AREA_2. However, in other embodiments, the size of the third zone Z3 may be less than the size of a memory block BLK, or the third zone Z3 may be distributed across a plurality of memory blocks BLK included in the second memory area MEM_AREA_2.

Referring again to FIG. 8, a first zone Z1 is included in a first memory area MEM_AREA_1, and the third zone Z3 is included in the second memory area MEM_AREA_2. However, in other embodiments not illustrated herein, the first zone Z1 may be included in the second memory area MEM_AREA_2 like the third zone Z3.

Cold data may be stored in the first zone Z1. When the memory area MEM_AREA_1 is full and there is no more free space, the controller 120 may migrate the cold data from the first zone Z1 to the third zone Z3 (S830). As a result of this migration, the controller 120 may free additional space to store cold data in the first memory area MEM_AREA_1.

Figure 9:
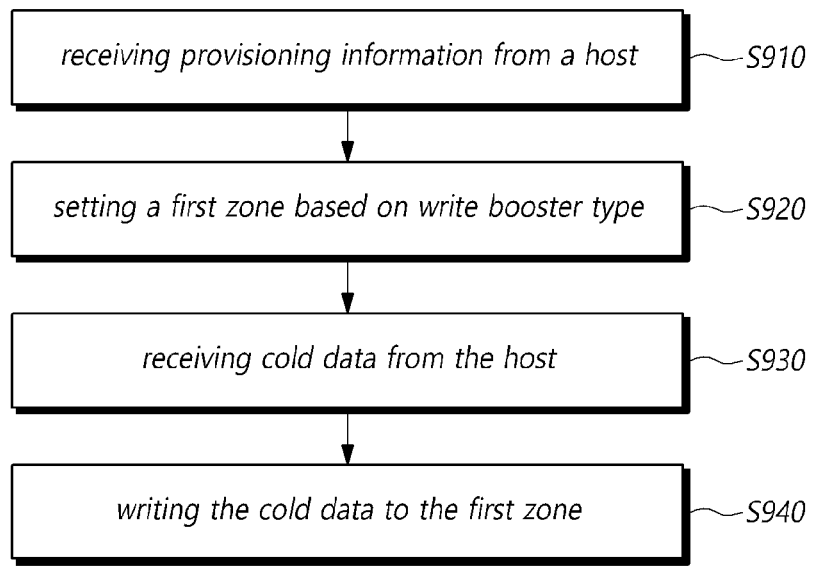
FIG. 9 illustrates a method of operating a storage device according to embodiments of the present disclosure.

FIG. 9 illustrates a method of operating a storage device according to embodiments of the present disclosure.

Referring to FIGS. 4 and 9, a method of operating a storage device 100 may include receiving a provisioning information PROV including a write booster type WB_TYPE from a host 300 (S910).

Then, the method of operating the storage device 100 may include setting a plurality of zones in the memory 110, which includes a plurality of memory blocks BLK. Based on the provisioning information PROV, the memory 110 may set a first zone Z1 from among a plurality of zones according to the write booster type WB_TYPE (S920).

The method of operating the storage device 100 may include receiving cold data from the host 300 (S930).

The method of operating the storage device 100 may include writing the cold data to the first zone Z1 (S940).

Referring to FIG. 5 and FIG. 9, in some embodiments if the write booster type WB_TYPE is a first type TYPE_1, then the operation S920 may set the first zone Z1 in a first memory area MEM_AREA_1 having memory blocks BLK with a first write speed WS1 and a first read speed RS1.

Referring to FIGS. 6 and 9, in some embodiments if the write booster type WB_TYPE is a second type TYPE_2, then the operation S920 may set the first zone Z1 in a second memory area MEM_AREA_2 having memory blocks BLK with a second write speed WS2 that is slower than the first write speed WS1 and a second read speed RS2 that is slower than the first read speed RS1.

The memory blocks BLK included in the first memory area MEM_AREA_1 may be SLC memory blocks, and the memory blocks BLK included in the second memory area MEM_AREA_2 may be TLC memory blocks. The first memory area MEM_AREA_1 may be set as a buffer to temporarily store data that is later written to the second memory area MEM_AREA_2.

The operation S920 may set a start address and a size of the first zone Z1 to an unchangeable state until receiving a subsequent provisioning operation request.

Referring to FIGS. 7 and 9, the method of operating the storage device 100 may further include setting a second zone Z2 from among the plurality of zones in the second memory area MEM_AREA_2, and writing hot data or warm data as requested by the host 300 to the second zone Z2.

Referring to FIGS. 8 and 9, the method of operating the storage device 100 may further include setting a third zone Z3 from among the plurality of zones in the second memory area MEM_AREA_2, and migrating the data stored in the first zone Z1 to the third zone Z3 when the first memory area MEM_AREA_1 is full.

Although exemplary embodiments of the disclosure have been described for illustrative purposes, those skilled in the art will appreciate that various modifications, additions, and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
a memory including a plurality of memory blocks and having a first memory area including memory blocks with a first write speed and a first read speed and a second memory area including memory blocks with a second write speed slower than the first write speed and with a second read speed slower than the first read speed; and
a controller configured to:
receive, from a host, provisioning information used to set a plurality of zones in the memory and
set a first zone from among the plurality of zones to store cold data based on a write booster type included in the provisioning information,
wherein the controller is configured to set the first zone in the first memory area if the write booster type is a first type,
wherein the controller is configured to set the first zone in the second memory area if the write booster type is a second type, and
wherein the controller is configured to set the first memory area as a buffer to temporarily store data to be written to the second memory area.

2. The storage device according to claim 1,
wherein the memory blocks included in the first memory area are Signal Level Cell (SLC) memory blocks, and
wherein the memory blocks included in the second memory area are Triple Level Cell (TLC) memory blocks.

3. The storage device according to claim 1,
wherein the second type has a value indicating that the buffer is used only for a specific logical unit, or a value indicating that the buffer is shared by a plurality of logical units.

4. The storage device according to claim 1,
wherein the controller is configured to change a size of the first memory area based on the provisioning information.

5. The storage device according to claim 1,
wherein the controller is configured to set a start address and a size of the first zone, which do not change until a subsequent provisioning operation request is received.

6. The storage device according to claim 1,
wherein the controller is configured to set a second zone from among the plurality of zones in the second memory area and to write hot data or warm data in the second zone as requested by the host.

7. The storage device according to claim 1,
wherein the controller is configured to set a second zone from among the plurality of zones in the second memory area and to migrate the cold data stored in the first zone to the second zone when the first memory area is full.

8. A method of operating a storage device, the method comprising:
receiving provisioning information including a write booster type from a host;
setting a plurality of zones in a memory including a plurality of memory blocks based on the provisioning information;
setting a first zone from among the plurality of zones based on the write booster type;
receiving cold data from the host; and
writing the cold data to the first zone;
wherein in the operation of setting the first zone,
the first zone is set in a first memory area including memory blocks with a first write speed and a first read speed if the write booster type is a first type, and
the first zone is set in a second memory area including memory blocks with a second write speed slower than the first write speed and with a second read speed slower than the first read speed if the write booster type is a second type,
wherein the first memory area is set as a buffer to temporarily store data to be written to the second memory area.

9. The method of claim 8,
wherein the memory blocks included in the first memory area are Signal Level Cell (SLC) memory blocks, and
wherein the memory blocks included in the second memory area are Triple Level Cell (TLC) memory blocks.

10. The method of claim 8,
wherein in the operation of setting the first zone, a start address and a size of the first zone are set to an unchangeable state until a subsequent provisioning operation request is received.

11. The method of claim 8, further comprising:
setting a second zone from among the plurality of zones in the second memory area; and
writing hot data or warm data requested by the host in the second zone.

12. The operating method of claim 8, further comprising:
setting a second zone from among the plurality of zones in the second memory area; and
migrating the cold data stored in the first zone to the second zone when the first memory area is full of data.

* * * * *